US012775094B2

(12) United States Patent

Chen

(10) Patent No.: US 12,775,094 B2

(45) **Date of Patent: *Oct. 27, 2026**

(54) POINT CLOUD DENSIFICATION METHOD AND APPARATUS, AND LIDAR

(71) Applicant: SUTENG INNOVATION TECHNOLOGY CO., LTD., Shenzhen (CN)

(72) Inventor: Huazhou Chen, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 444 days.

This patent is subject to a terminal disclaimer.

(21) Appl. No.: 18/416,874

(22) Filed: Jan. 18, 2024

(65) Prior Publication Data

US 2024/0159908 A1 May 16, 2024

Related U.S. Application Data

(63) Continuation of application No. 18/220,255, filed on Jul. 10, 2023, now Pat. No. 11,914,044.

(30) Foreign Application Priority Data

Jul. 26, 2022 (CN) ........................ 202210884735.X

(51) Int. Cl.

*G01S 17/89* (2020.01)

*G01S 7/481* (2006.01)

(52) U.S. Cl.

CPC ............ *G01S 17/89* (2013.01); *G01S 7/4817* (2013.01)

(58) Field of Classification Search

CPC ...... G01S 17/89; G01S 7/4817; G01S 17/931; G01S 17/933; G01S 17/42; G01S 17/48; Y02A 90/10

See application file for complete search history.

(56) References Cited

U.S. PATENT DOCUMENTS 11,415,675 B2 8/2022 Russell et al.

11,914,044 B2 * 2/2024 Chen ...................... G01S 17/89

(Continued)

FOREIGN PATENT DOCUMENTS

CN 108267746 A 7/2018

CN 112352168 A 2/2021

OTHER PUBLICATIONS

First Office Action issued in related Chinese Application No. 202210884735.X, mailed Sep. 26, 2022, 9 pages.

(Continued)

*Primary Examiner* — Jonathan Malikasim

(74) *Attorney, Agent, or Firm* — BAYES PLLC

(57) ABSTRACT

Embodiments of this application disclose a point cloud densification method and apparatus, a storage medium, and a LiDAR. The method is applied to the LiDAR, the LiDAR includes an emitter group and a scanning apparatus, and the method includes: obtaining a point cloud densification multiple of a detection field of view at each level; obtaining an interval between scanning lines corresponding to two adjacent emissions based on the point cloud densification multiple of the detection field of view at each level; and performing scanning based on the interval between the scanning lines corresponding to the two adjacent emissions.

9 Claims, 16 Drawing Sheets

(56) References Cited

U.S. PATENT DOCUMENTS

| | | | | |
|---|---|---|---|---|
| 2013/0229696 | A1* | 9/2013 | Takikawa | G06K 15/1209 358/474 |
| 2018/0045509 | A1* | 2/2018 | Honkanen | G01B 11/2518 |
| 2019/0107623 | A1* | 4/2019 | Campbell | G01S 7/4865 |
| 2019/0353758 | A1* | 11/2019 | Shin | F16H 61/00 |
| 2020/0309917 | A1* | 10/2020 | Kudla | G01S 17/04 |
| 2021/0339738 | A1* | 11/2021 | Lashkari | G01S 17/86 |
| 2023/0011101 | A1* | 1/2023 | Dahlberg | G01S 7/497 |
| 2023/0096608 | A1* | 3/2023 | Dahlberg | G01S 7/4868 356/4.01 |
| 2024/0036205 | A1* | 2/2024 | Chen | G01S 17/931 |
| 2024/0134050 | A1* | 4/2024 | Keilaf | G01S 17/42 |

OTHER PUBLICATIONS

European search report issued in related European application No. 23184839.1, mailed Nov. 20, 2023.

* cited by examiner

POINT CLOUD DENSIFICATION METHOD AND APPARATUS, AND LIDAR

CROSS-REFERENCE TO RELATED APPLICATION

The present application is a continuation of application Ser. No. 18/220,255, filed on Jul. 10, 2023, which claims the benefit of priority to Chinese Patent Application No 202210884735.X, filed on Jul. 26, 2022. The entire contents of each of the above-identified applications are hereby incorporated by reference in their entirety.

TECHNICAL FIELD

This application relates to the field of computer technologies, and in particular, to a point cloud densification method, an apparatus, and a LiDAR.

BACKGROUND

A LiDAR can directly fast image three-dimensional space with high precision, and therefore, has become one of mainstream sensors in existing autonomous driving technologies. A development trend of the LiDAR is towards stronger ranging, higher point cloud density, and better obeyance of laws and regulations regarding safety of human eyes. Laser beam bands of vehicle-mounted LiDARs are all infrared bands, mainly including two bands around 900 nm and 1500 nm. The LiDAR on the 1500 nm band has a higher safety threshold for human eyes. However, it is difficult to commercialize such LiDAR on a large scale in the short to medium term due to material constraints and high costs of emission modules and receiving modules of such LiDAR. The 900 nm LiDAR has a low safety threshold for human eyes, which limits continuous improvement of point cloud density of such LiDAR while meeting requirements of specific ranging performance.

SUMMARY

Embodiments of this application provide a point cloud densification method and apparatus, a storage medium, and a LiDAR, which can densify region of interest (ROI) by controlling an interval between scanning lines of two adjacent emissions and improve detection efficiency of the LiDAR while ensuring safety of human eyes.

According to a first aspect, an embodiment of this application provides a point cloud densification method, applied to a LiDAR, where the LiDAR includes an emitter group and a scanning apparatus, and the method includes: obtaining a point cloud densification multiple of a detection field of view at each level; obtaining an interval between scanning lines corresponding to two adjacent emissions based on the point cloud densification multiple of the detection field of view at each level; and performing scanning based on the interval between the scanning lines corresponding to the two adjacent emissions.

According to a second aspect, an embodiment of this application provides a point cloud density densification apparatus, applied to a LiDAR, where the LiDAR includes an emitter group and a scanning apparatus, and the apparatus includes: an densification multiple obtaining module, configured to obtain a point cloud densification multiple of a detection field of view at each level; an interval calculation module, configured to obtain an interval between scanning lines corresponding to two adjacent emissions based on the point cloud densification multiple of the detection field of view at each level; and a scanning module, configured to perform scanning based on the interval between the scanning lines corresponding to the two adjacent emissions.

According to a third aspect, an embodiment of this application provides a computer storage medium, where the computer storage medium stores a plurality of instructions, and the instructions are capable of being loaded by a processor to perform the steps of the forgoing method.

According to a fourth aspect, an embodiment of this application provides a LiDAR, including a processor and a memory, where the memory stores a computer program, and the computer program is capable of being loaded by the processor to perform the steps of the forgoing method.

In the embodiments of this application, the point cloud densification multiple of the detection field of view at each level is obtained, the interval between scanning lines corresponding to two adjacent emissions is obtained based on the point cloud densification multiple, and scanning is performed based on the interval between the scanning lines of the two adjacent emissions, which can densify the ROI by controlling the interval between the scanning lines of the two adjacent emissions and improve the detection efficiency of the LiDAR while ensuring the safety of human eyes.

BRIEF DESCRIPTION OF DRAWINGS

To explain embodiments of the present application more clearly, the following briefly introduces the drawings used in the embodiments. The drawings in the following description are only some embodiments of the present application.

DETAILED DESCRIPTION

To make objectives, technical solutions, and advantages of the present application clearer, embodiments of the present application are described in further detail below with reference to the drawings.

When the following description refers to the drawings, unless otherwise indicated, the same numbers in different drawings indicate the same or similar elements. The implementation described in the following exemplary embodiments do not represent all implementations consistent with the present application.

In the description of the present application, the terms such as "first" and "second" are merely intended for a purpose of description, and shall not be understood as an indication or implication of relative importance. In addition, in the descriptions of this application, "a plurality of" means two or more unless otherwise specified. Herein, "and/or" is an association relationship for describing associated objects and indicates that three relationships may exist. For example, A and/or B may mean the following three cases: Only A exists, both A and B exist, and only B exists. The character "/" generally indicates an "or" relationship between the associated objects.

Laser beam bands of a vehicle-mounted LiDAR are all infrared bands, mainly including two bands around 900 nm and 1500 nm. The LiDAR on the 1500 nm band has a higher safety threshold for human eyes. However, it is difficult to commercialize such LiDAR on a large scale in the short to medium term due to material constraints and high costs of emission modules and receiving modules of such LiDAR. The 900 nm LiDAR has a low safety threshold for human eyes, which limits continuous improvement of point cloud density of such LiDAR while meeting requirements of specific ranging performance.

In an example, in a long-distance detection field of view close to a vehicle and a road, the LiDAR needs to implement high point cloud density. In another position, the LiDAR needs low point cloud density to satisfy a requirement of detecting a surrounding environment. Therefore, a concept of a region of interest (ROI) is proposed in the LiDAR industry, the region of interest (ROI) is generally a region of LiDAR's interest. Generally, the LiDAR needs to implement high point cloud density in the region of interest (ROI). The LiDAR also includes a general detection region, and the general detection region is a region other than the region of interest (ROI) in the total detection field of view. The region of interest (ROI) can also be referred to as a target detection field of view of the LiDAR, the general detection region can also be referred to as the general detection field of view of the LiDAR, and a sum of the target detection field of view and the general detection field of view is the total field of view of the LiDAR.

Figure 1:
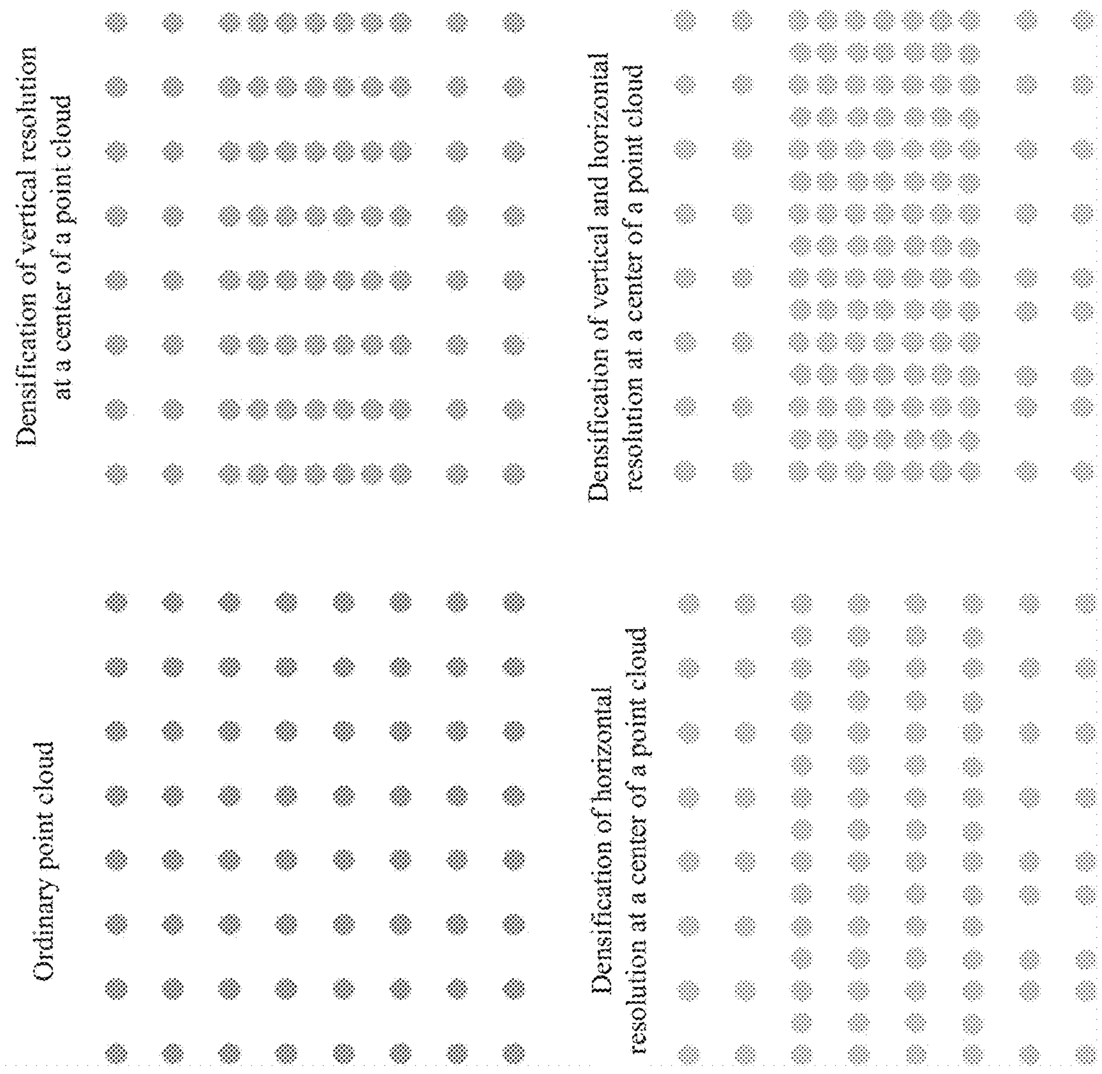
FIG. 1 is a schematic diagram of an example of point cloud density distribution in horizontal and vertical directions according to an embodiment.

Generally, the detection field of view of the LiDAR can be divided into two dimensions: vertical and horizontal dimensions. In the general LiDAR, the point cloud density is uniformly distributed in the entire detection field of view, as shown in an upper left corner of FIG. 1. For the ROI, there are the following densification: horizontal point cloud density densification, as shown in the upper right corner of FIG. 1; vertical point cloud density densification, as shown in a lower left corner of FIG. 1; or densification of both the horizontal point cloud density and the vertical point cloud density, as shown in a lower right corner of FIG. 1.

The point cloud densification method provided in this embodiment is described below with reference to FIG. 2 to FIG. 11. The method may be implemented by a computer program, which can run on a point cloud densification apparatus based on the Von Neumann architecture. The computer program can be integrated into an application or run as an independent tool application. A point cloud densification apparatus in this embodiment of this application may include but not limited to a LiDAR, a vehicle-mounted device, an airplane, a train, a handheld device, a wearable device, a computing device, or another processing device connected to a wireless modem. The LiDAR includes an emitter group, a scanning apparatus, a receiving apparatus, and a signal processor.

Figure 2:
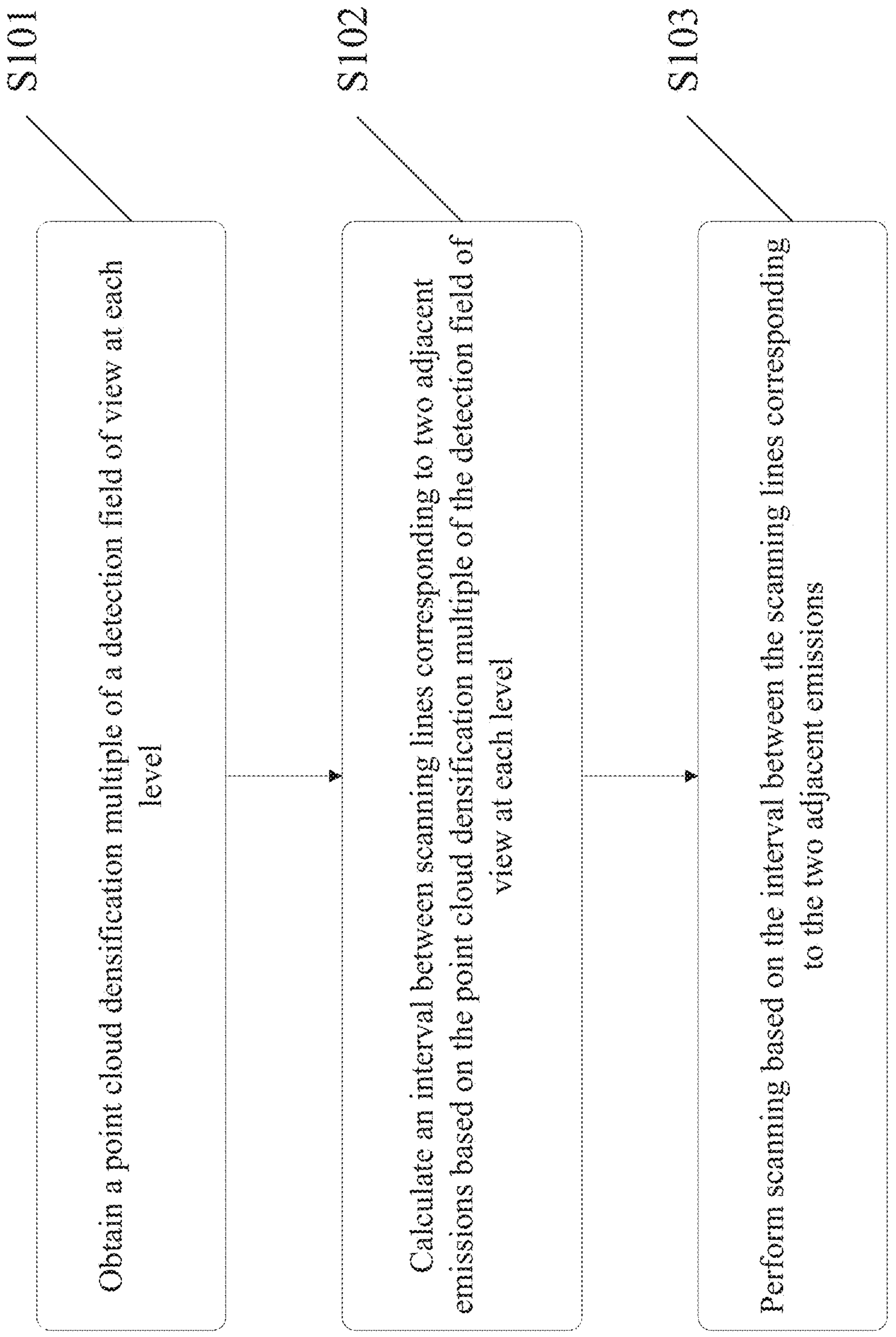
FIG. 2 is a flowchart of a point cloud densification method according to an embodiment.

FIG. 2 is a flowchart of a point cloud densification method according to an embodiment of this application.

As shown in FIG. 2, the method in this embodiment of this application may include the following steps.

S101. Obtain a point cloud densification multiple of a detection field of view at each level.

The detection field of view of the LiDAR includes the total detection field of view and the target detection field of view. The target detection field of view is the region of interest (ROI), and based on a requirement of detecting point cloud density of the target detection field of view, the target detection field of view can include at least one level of detection field of view such as a primary detection field of view or a secondary detection field of view. For example, the target detection field of view may include, a primary detection field of view, a secondary detection field of view, a tertiary detection field of view, . . . , a level-n detection field of view.

In an embodiment, the point cloud density of the detection field of view at each level may be related to a level number of the detection field of view. For example, the lower the level number, the higher the point cloud density, which changes regularly. For example, point cloud density of the primary detection field of view is the highest, point cloud density of the secondary detection field of view is the second highest, . . . , point cloud density of the level-n detection field of view is the lowest, where n>2. In some embodiments, the point cloud density of the detection field of view at each level may not be strongly correlated with the level number of the detection field of view, provided that the target detection fields of view at levels have different point cloud density. For example, point cloud density of the primary detection field of view is the highest, point cloud density of the level-n detection field of view is the second highest, . . . , point cloud density of the secondary detection field of view is the lowest, where n>2. The target detection fields of view at levels have different point cloud density. In some embodiments, requirements for point cloud densification multiples of detection fields of view at levels may be all different. In some embodiments, the primary detection field of view is a central detection field of view, the secondary detection field of view is a secondary densification field of view between the central detection field of view and the general detection field of view, and each level of detection field of view corresponds to a corresponding densification multiple. The densification multiplier can be set based on a current need.

S102. Obtain an interval between scanning lines corresponding to two adjacent emissions based on the point cloud densification multiple of the detection field of view at each level.

The LiDAR can emit N scanning points at a time. When the LiDAR includes multiple emitter groups, the N scanning points can be outgoing laser beams emitted by one emitter group, or can be N scanning points formed by multiple emitter groups during simultaneous emission.

In some embodiments of this application, when the LiDAR has two scanning directions, the interval between the scanning lines can be implemented by a scanning apparatus by performing scanning in one dimension. For example, the LiDAR can emit N scanning points at a time to form N scanning lines. An interval between the scanning lines is $\delta\theta$, and a rotational speed in the two scanning directions (horizontal and vertical directions) are denoted as $\omega_{\parallel}$ and $\omega_{\perp}$. Functions in the two directions can be exchanged. In one scanning cycle, a change angle of light completing a scanning cycle in the horizontal direction is denoted as $\alpha_{period}$, and the detection field of view in the horizontal direction is denoted as $\alpha_{FOV}$, and in this case, $\alpha_{FOV} \leq \alpha_{period}$.

In the vertical direction, the interval between groups of scanning lines corresponding to two adjacent emissions is denoted as $\delta\beta$, and the interval between the scanning lines can be implemented by a scanning apparatus by performing scanning in one dimension. For example, in the vertical direction, the scanning apparatus can move at a uniform speed in the entire scanning cycle, as shown in FIG. 3, the following formula can be obtained:

$$\delta\beta = \frac{\alpha_{period}}{\omega_{\parallel}}\omega_{\perp}$$

Figure 3:
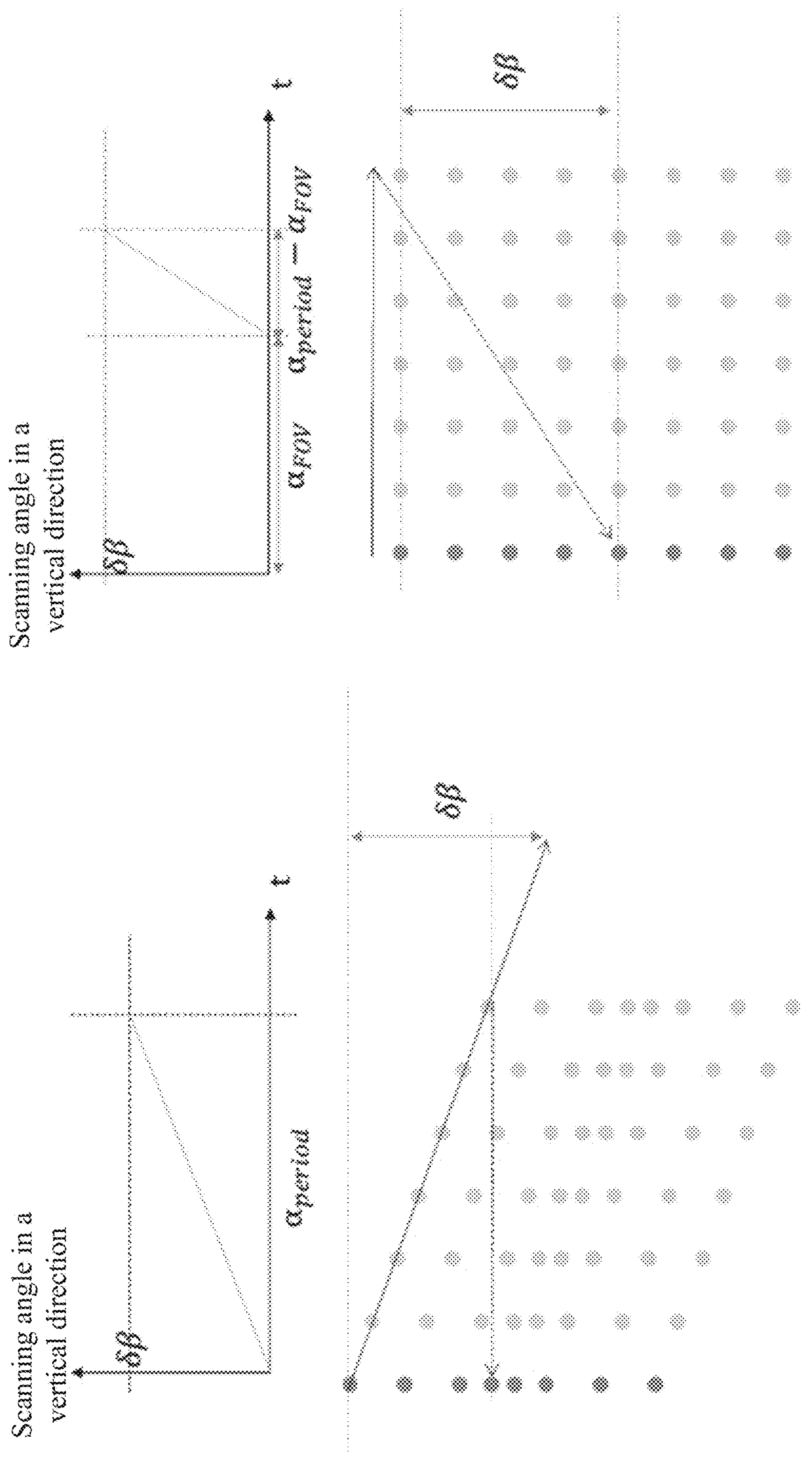
FIG. 3 is a schematic diagram of an example of obtaining an interval between scanning lines corresponding to two adjacent emissions according to an embodiment.

If the change angle $\alpha_{period}$ of light in the scanning cycle exceeds the detection field of view $\alpha_{FOV}$ in the horizontal direction, the scanning apparatus can quickly rotate by an angle in a non-luminous region, as shown in FIG. 3, and in this case, the following formula can be obtained:

$$\delta\beta = \frac{\alpha_{period} - \alpha_{FOV}}{\omega_{\parallel}}\omega_{\perp}$$

Herein, $\delta\beta$ is set by adjusting the scanning mode of the scanning apparatus in one dimension, to set a form of the detection point cloud more reasonably.

Figure 4A:
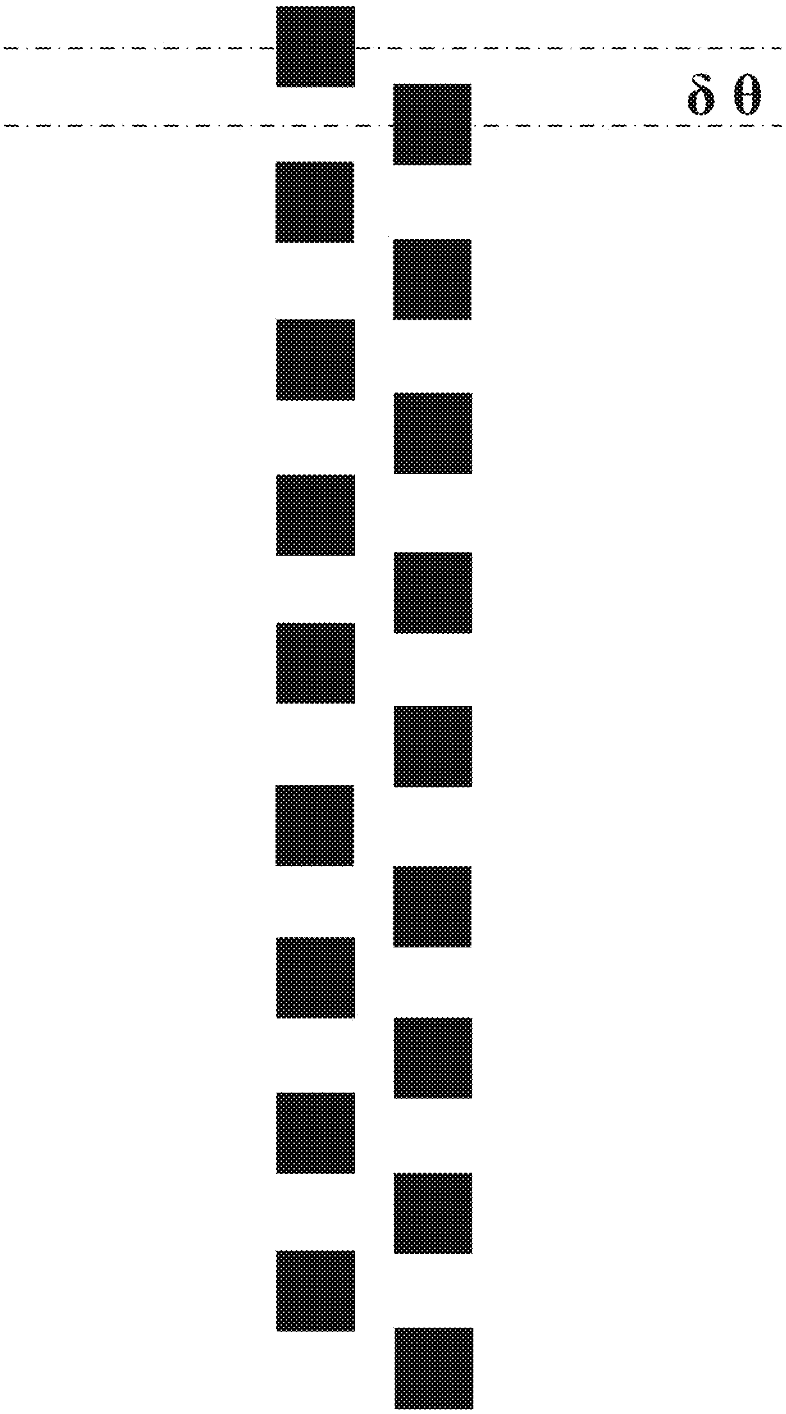
FIG. 4*a* is a schematic diagram of arrangement of emitters in the same emitter group according to an embodiment.
Figure 4B:
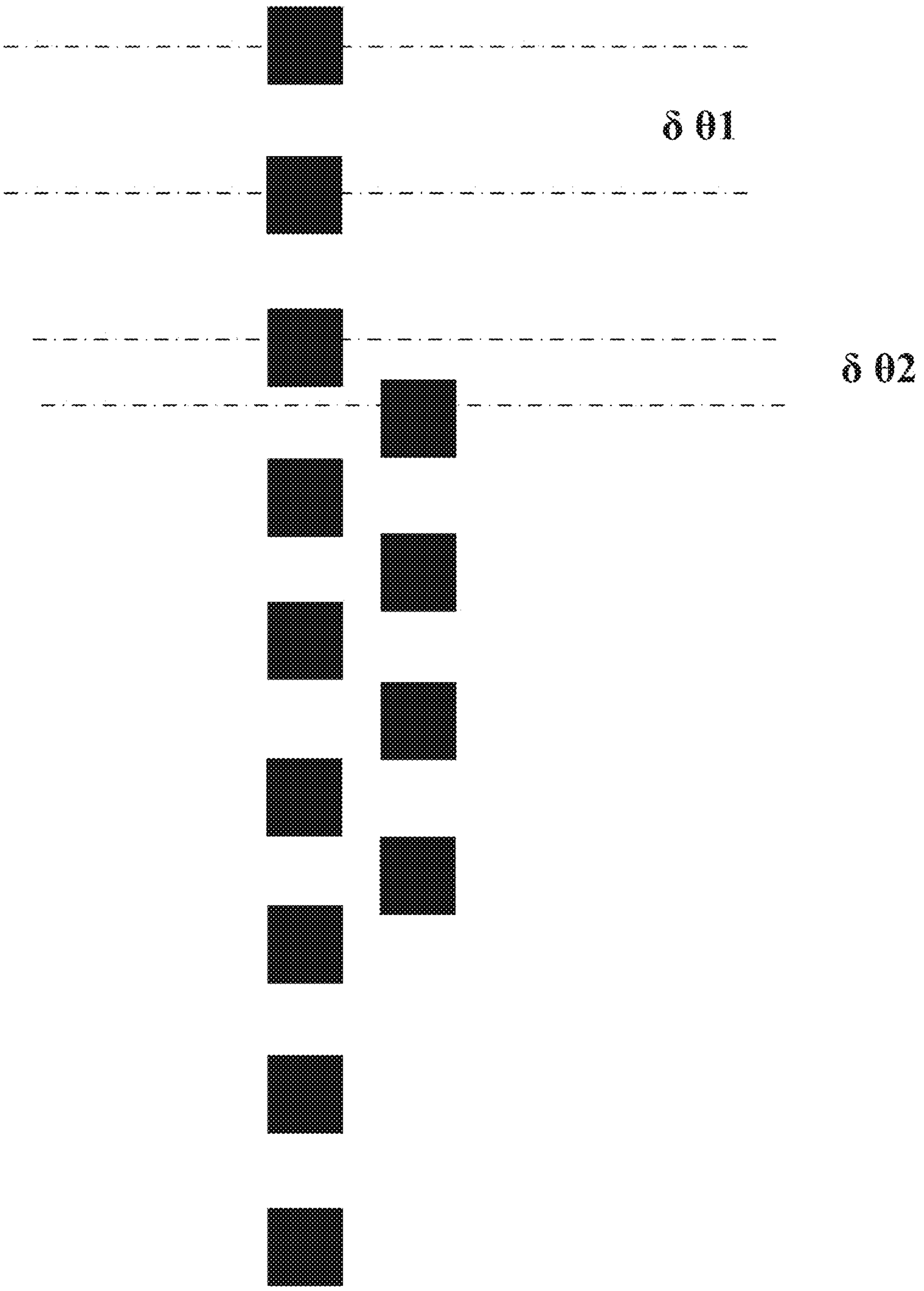
FIG. 4*b* is another schematic diagram of arrangement of emitters in the same emitter group according to an embodiment.
Figure 4C:
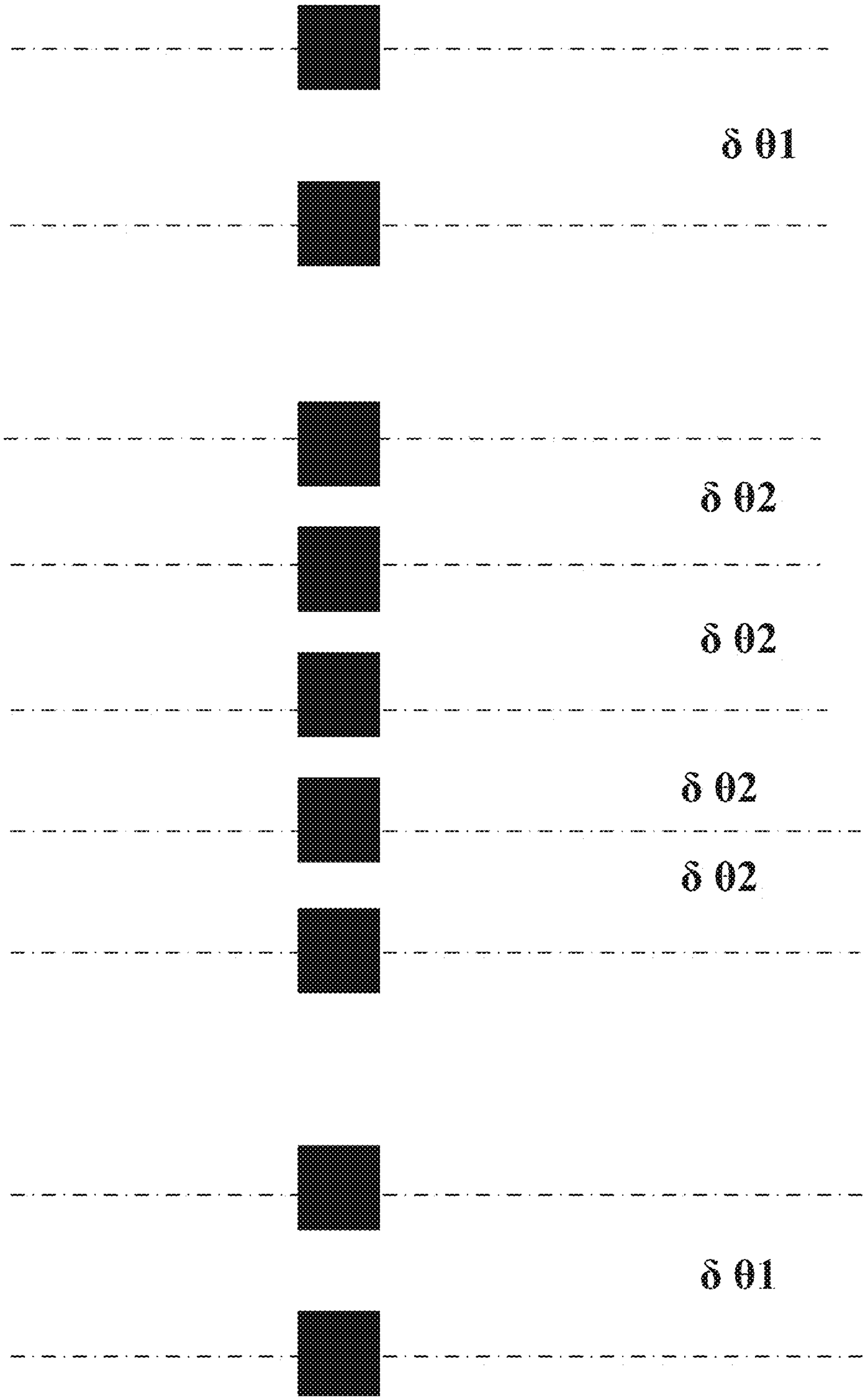
FIG. 4*c* is still another schematic diagram of arrangement of emitters in the same emitter group according to an embodiment.

The scanning apparatus in one dimension may be, for example, a rotating mirror, a one-dimensional galvanometer, or a rotating platform. A scanning apparatus in another dimension can also be, for example, a rotating mirror, a one-dimensional galvanometer, or a rotating platform. Types of the scanning apparatus in the first dimension and the scanning apparatus in the second dimension may be the same or different. In an embodiment, the scanning apparatuses in the two dimensions can be individually controlled. Multiple densification modes can be combined by rationally selecting the interval $\delta\theta$ between scanning lines and the interval $\delta\beta$ between two adjacent scanning line groups. $\delta\beta$ can be implemented in the two ways described above. The interval $\delta\theta$ between the scanning lines herein can be implemented by setting an arrangement interval between emitters or by controlling emitting lasers to perform emission at intervals. The interval $\delta\theta$ between the scanning lines herein may be implemented in a manner not limited to that in the foregoing description. The same emitter group can be arranged in one column or different columns. When the same emitter group is arranged in two columns, as shown in FIG. 4*a*, $\delta\theta$ can be reduced by arranging all the emitters in the same emitter group in a staggered manner; as shown in FIG. 4*b*, $\delta\theta$ in a target region is reduced by arranging emitters in a staggered manner in a partial region; and as shown in FIG. 4*b*, an interval between emitters in an edge region is $\delta\theta 1$, and an interval between emitters in a central region is $\delta\theta 2$, where $\delta\theta 2 \leq \delta\theta 1$. With such design, the point cloud density in the target region can be further improved while an interval between two emission angles remains unchanged. When the emitters in the same emitter group are arranged in a column, the interval between the emitters at the edge and the interval between the emitters in the central region can also be set to be different, so that a point cloud in the target region is denser. As shown in FIG. 4*c*, an interval between edge emitters in the same emitter group is $\delta\theta_1$, and an interval between central emitters is $\delta\theta_2$, where $\delta\theta_2 \geq \delta\theta_1$. An angle interval of emission devices in emitter groups in the edge field of view and the central field of view and the number of scanning groups can be determined based on point cloud density requirements for the target field of view and the edge field of view.

The emitter may be a vertical-cavity surface-emitting Laser (VCSEL) or an edge emitting laser (EEL), or a fiber laser emits light, and an outgoing array is formed in a light splitting method. Multiple emitter groups can be arranged in one column or different columns. A specific arrangement manner of multiple emitter groups is not limited in this application. In some embodiments, intervals between the lasers in different emitter groups may be the same or different.

In some embodiments, if the LiDAR is in a single-emission single-reception mode, one emission corresponds to one reception, the point cloud density includes horizontal resolution or vertical resolution, an interval $\delta\theta$ between scanning lines of each emitter group is obtained; and a product of multiplying the number N of scanning lines of the detection field of view at each level by the interval $\delta\theta$ between the scanning lines of each emitter group is calculated, and a quotient of dividing the product by the point cloud density densification multiple n is calculated, to obtain the interval between the scanning lines of the two adjacent emissions, where $$\delta\beta = \frac{N}{n}\delta\theta.$$

the interval between the scanning lines of the two adjacent emissions refers to an interval between first scanning lines of the emissions. When a scanning interval of the two emissions is an interval between scanning lines of two emissions of the same emitter group, the scanning interval is a step size of the scanning apparatus in the first direction. densification can be implemented horizontally or vertically by setting the step size of the scanning apparatus in the same direction.

Further, when the emission interval is constant, densification can be implemented horizontally or vertically by setting the densification multiple and the number of emitters corresponding to the same emitter group.

When the interval between the scanning lines of each emitter group is determined, and the densification multiple n is a prime number indivisible by the number N of emitters in the same emitter group, the interval between the scanning lines of two emissions can be used for vertical densification.

When the interval between the scanning lines of each emitter group is determined, and the densification multiple n is an integer divisible by the number N of emitters in the same emitter group, the interval between the scanning lines of two emissions can be used for horizontal densification.

S103. Perform scanning based on the interval between the scanning lines corresponding to the two adjacent emissions.

Scanning is performed based on the set interval between the scanning lines corresponding to the two adjacent emissions, so that point cloud densification can be implemented horizontally and/or vertically.

When the interval between the scanning lines corresponding to the two emissions can be implemented by the scanning apparatus by performing scanning in one dimension, and a scanning interval of the two adjacent emissions is an interval between scanning lines of two emissions of the same emitter group, the scanning interval is a step size of the scanning apparatus in the dimension.

The same emitter group can be lasers arranged in one column, lasers arranged in one row, lasers arranged in two columns, or lasers arranged in two rows.

The LiDAR has a first scanning direction and a second scanning direction, and the interval between the scanning lines is implemented by a scanning apparatus by performing scanning in the first scanning direction. If a change angle of light in one scanning cycle in the second direction is greater than a detection angle of view set in the second direction, a difference between the change angle of light in one scanning cycle in the second direction and the detection angle of view set in the second direction is calculated; and a quotient of dividing the difference by a scanning speed in the second direction is calculated, to obtain time corresponding to the two adjacent emissions corresponding to the interval between the scanning lines. The emitter group emits a detection laser beam to the scanning apparatus based on the time, and the scanning apparatus emits the detection laser beam to the detection field of view for scanning.

When the scanning apparatus moves at a uniform speed in the second direction, a scanning speed in the second direction is a uniform moving speed of the scanning apparatus; or when the scanning apparatus moves at a non-uniform speed in the second direction, a scanning speed in the second direction is an average moving speed of the scanning apparatus in the second direction.

In embodiments of this application, the point cloud densification multiple of the detection field of view at each level is obtained, the interval between scanning lines corresponding to two adjacent emissions is obtained based on the point cloud densification multiple of the detection field of view at each level, and scanning is performed based on the interval between the scanning lines corresponding to the two adjacent emissions, which can densify the ROI region by controlling the interval between the scanning lines corresponding to the two adjacent emissions and improve the detection efficiency of the LiDAR while ensuring the safety of human eyes.

Figure 5:
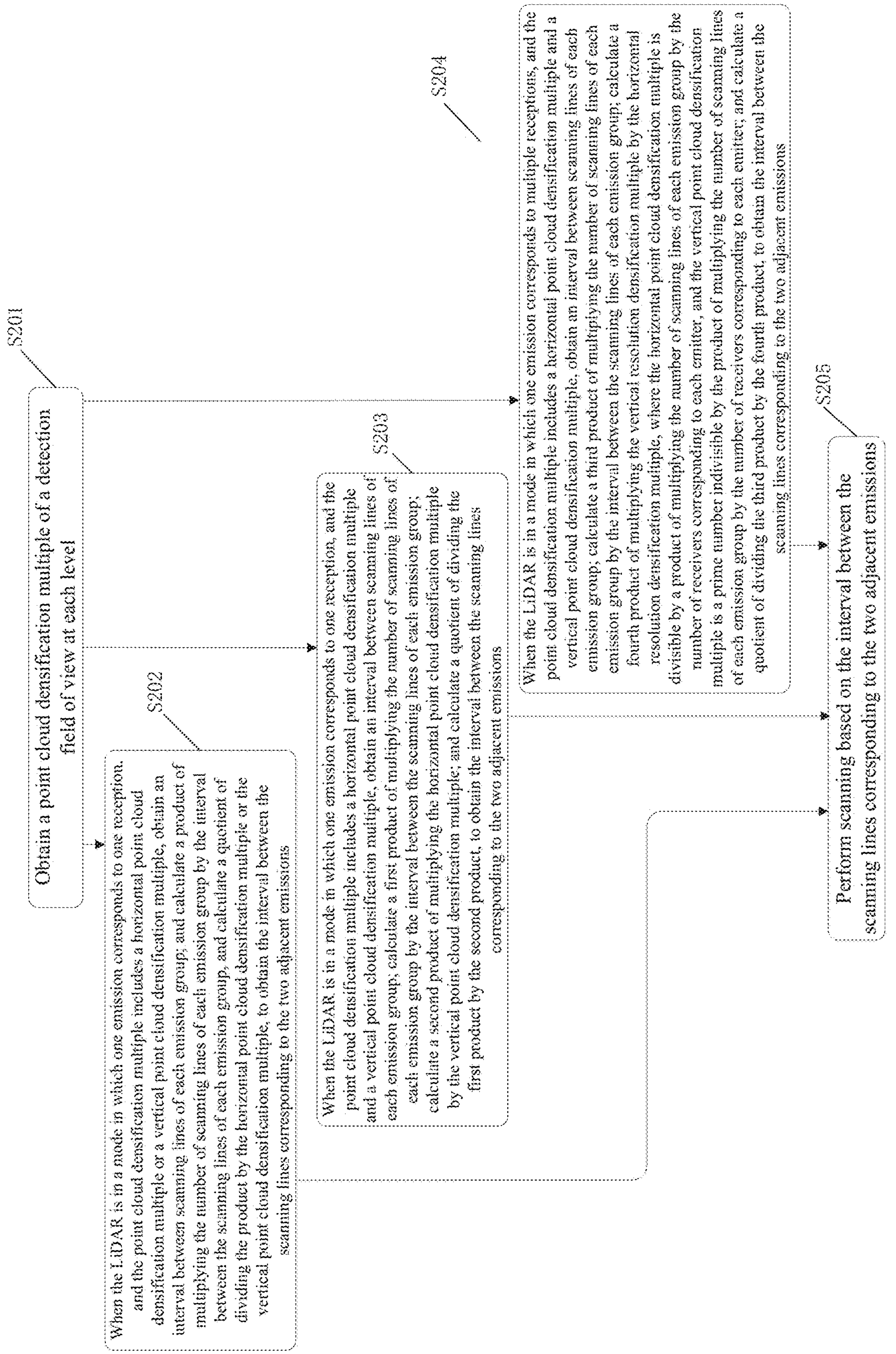
FIG. 5 is a schematic diagram of an example of point cloud distribution in horizontal and vertical directions according to an embodiment.

FIG. 5 is a flowchart of a point cloud densification method according to an embodiment of this application. As shown in FIG. 5, the point cloud densification method may include the following steps.

S201. Obtain a point cloud densification multiple of a detection field of view at each level.

The number of scanning lines emitted by the emitter group is based on performance of the emitter group itself. For example, the number of scanning lines of each emitter group is N, and the interval between each two scanning lines is δθ.

Based on a densification requirement, the number N of corresponding scanning lines is set for the detection field of view at each level. For example, the number of scanning lines of the primary detection field of view is N1, and the number of scanning lines of the secondary detection field of view is N2.

In some embodiments, a quotient of dividing the number N of scanning lines of the detection field of view at each level by the number X of scanning lines of each emitter group is calculated, to obtain the point cloud densification multiple n of the detection field of view at each level, that is, n=N/X.

S202. When the LiDAR is in a mode in which one emission corresponds to one reception, and the point cloud densification multiple includes a horizontal point cloud densification multiple or a vertical point cloud densification multiple, obtain an interval between scanning lines of each emitter group; and calculate a product of multiplying the number of scanning lines of each emitter group by the interval between the scanning lines of each emitter group, and calculate a quotient of dividing the product by the horizontal point cloud densification multiple or the vertical point cloud densification multiple, to obtain the interval between the scanning lines corresponding to the two adjacent emissions.

In some embodiments, if the LiDAR is in a single-emission single-reception mode, that is, a mode in which one emission corresponds to one reception, and the point cloud densification multiple includes a horizontal point cloud densification multiple or a vertical point cloud densification multiple, an interval dB between scanning lines of each emitter group is obtained; and a product of multiplying the number N of scanning lines of each emitter group by the interval dB between the scanning lines of each emitter group is calculated, and a quotient of dividing the product by the horizontal point cloud density densification multiple or the vertical point cloud densification multiple n is calculated, to obtain the interval between the scanning lines corresponding to the two adjacent emissions, where $$\delta\beta = \frac{N}{n}\delta\theta.$$

Figure 6:
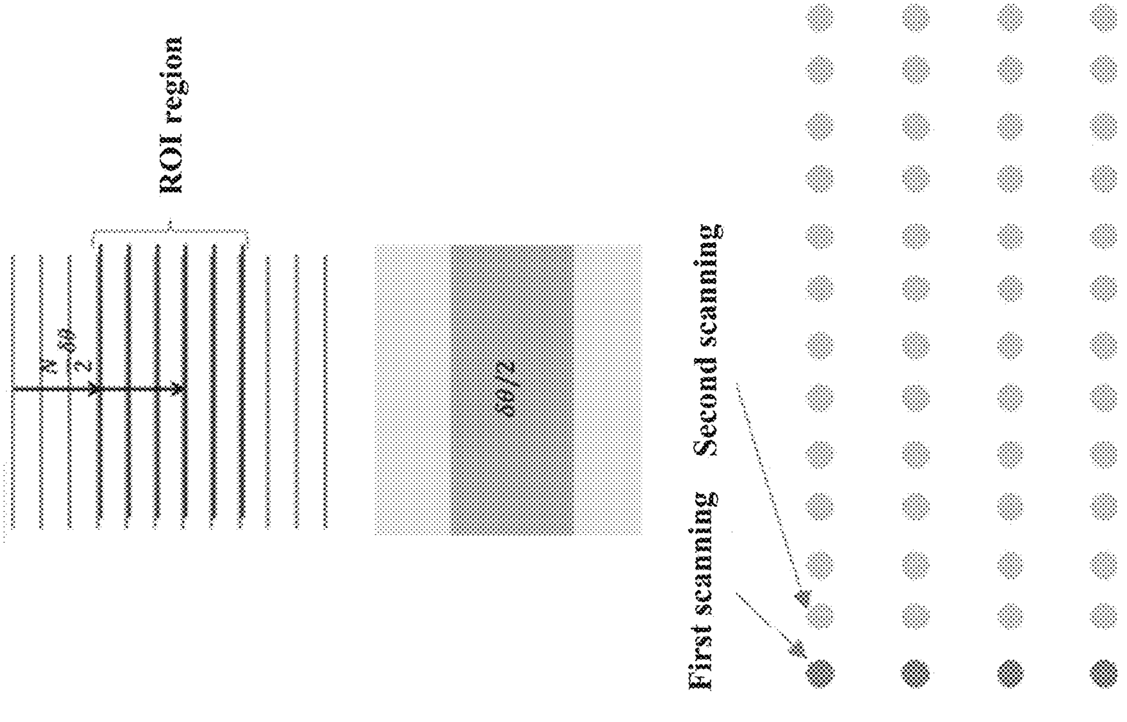
FIG. 6 is a schematic diagram of an example of improving point cloud density in the horizontal direction according to an embodiment.

FIG. 6 shows a densification manner in the horizontal direction. Assuming that the scanning line at density of $$\frac{\delta\theta}{n}$$

is implemented in the central detection field of view, the following formula needs to be satisfied:

$$\delta\beta = \frac{N}{n}\delta\theta$$

In the formula, n is a number divisible by N. As shown in FIG. 6, N is 6, and n is 2. For the scanning lines of the central detection field of view, the scanning lines are used for scanning twice. Assuming that an interval between horizontal scanning lines is $\delta\theta_{\backslash\backslash}$, during first scanning, scanning moments are selected as 0, $\delta\theta_{\backslash\backslash}$, $2\delta\theta_{\backslash\backslash}$ . . . ; during second scanning, scanning moments are selected as $$\frac{\delta\theta_{\backslash\backslash}}{2}, 3\frac{\delta\theta_{\backslash\backslash}}{2}, 5\frac{\delta\theta_{\backslash\backslash}}{2} \ldots ;$$

and two scanning operations can be combined to form scanning point distribution with horizontal resolution of $$\frac{\delta\theta_{\backslash\backslash}}{2},$$

thereby increasing the point cloud density in the horizontal direction. Through such control of the emission moment, scanning is repeatedly performed several times in the horizontal direction, which can correspondingly increase the point cloud density by several folds in the horizontal direction. That is, by maintaining a vertical position unchanged during the two scanning operations and changing the scanning time interval, the horizontal densification multiple can be changed.

Figure 7:
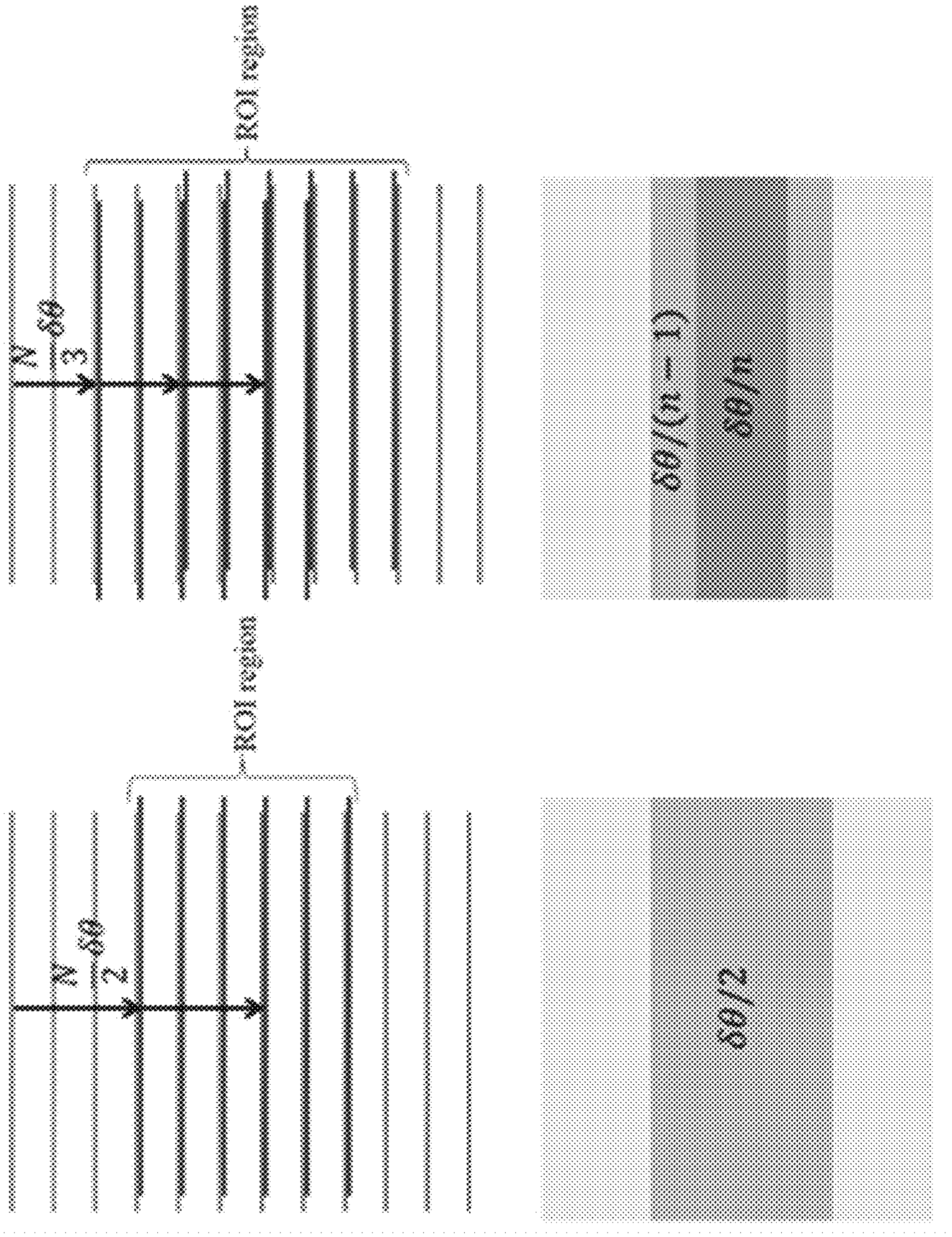
FIG. 7 is another schematic diagram of an example of improving point cloud density in the horizontal direction according to an embodiment.

When n=2, only the middle group is densified, and the horizontal resolution in the ROI region is doubled at this time. When n>2, the resolution in the central region is n times as the original resolution. As the ROI region extends from the center to the edge, the resolution gradually becomes n−1 times as the original resolution, n−2 times the original resolution, n−3 times the original resolution, and is finally transited to the original resolution. As a schematic illustration, FIG. 7 shows characteristics of scanning lines in two cases that n=2 and n=3.

Figure 8:
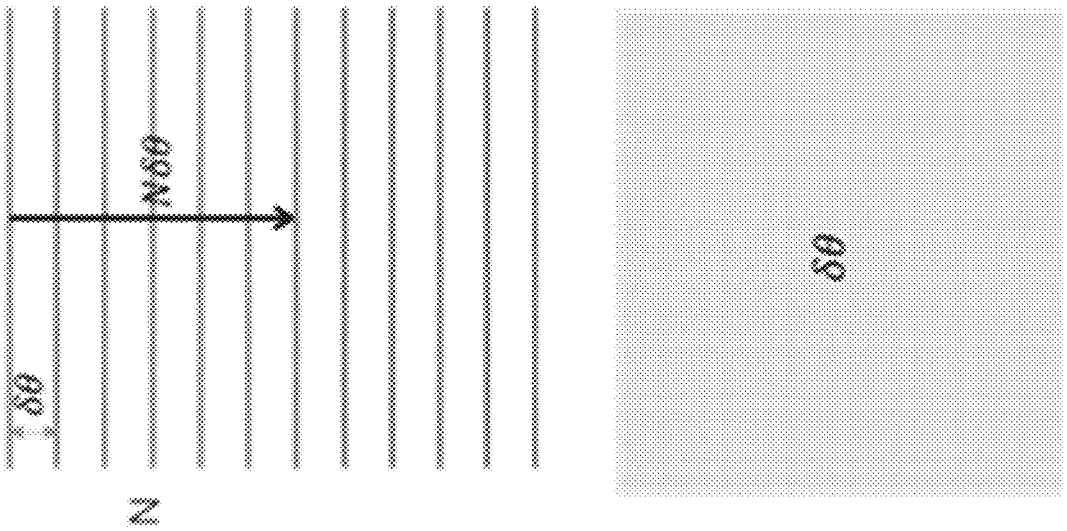
FIG. 8 is a schematic diagram of an example of point cloud distribution in the vertical direction according to an embodiment.

FIG. 8 shows a densification manner in the vertical direction. For N scanning lines at intervals of $\delta\theta$, when $\delta\beta$ is $N\delta\theta$, two groups of scanning lines in the vertical direction are just staggered. An arrow indicates a change in vertical angles during different scanning processes.

S203. When the LiDAR is in a mode in which one emission corresponds to one reception, and the point cloud densification multiple includes a horizontal point cloud densification multiple and a vertical point cloud densification multiple, obtain an interval between scanning lines of each emitter group; calculate a first product of multiplying the number of scanning lines of each emitter group by the interval between the scanning lines of each emitter group; calculate a second product of multiplying the horizontal point cloud densification multiple by the vertical point cloud densification multiple; and calculate a quotient of dividing the first product by the second product, to obtain the interval between the scanning lines corresponding to the two adjacent emissions.

Based on the foregoing increase in the horizontal density, an interpolation method is also compatible, so that both the vertical and horizontal density in the central detection field of view can be increased.

Figure 9:
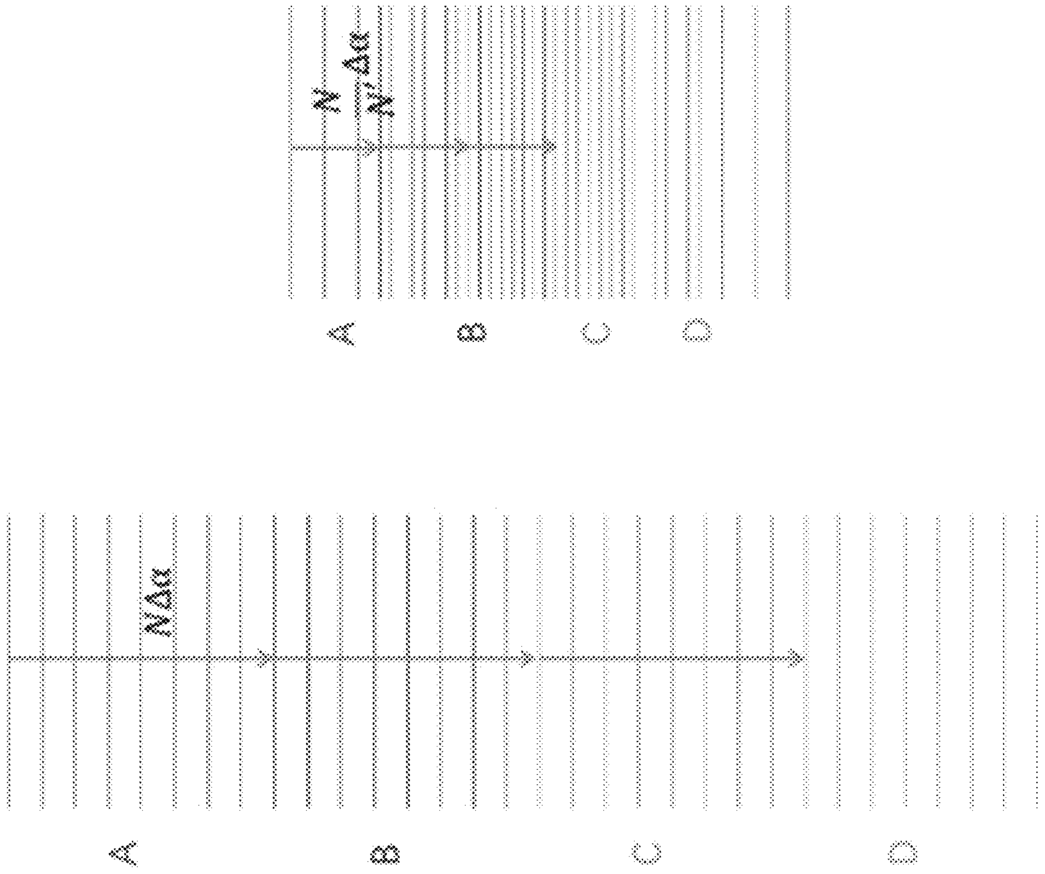
FIG. 9 is a schematic diagram of an example of improving point cloud density in the vertical direction according to an embodiment.

First, the interpolation method is briefly explained. As shown in FIG. 9, the figure shows a group of scanning lines emitted by the laser at different moments, where the scanning lines are denoted as A, B, C, and D. Assuming that the number of scanning lines in each group is N (that is, the number of emitters in each emitter group), the interval between the scanning lines is $\delta\theta$. As time goes on, the scanning line moves downwards for scanning gradually from A to B, then to C, and then to D (marked by arrows), and moves downwards by N each time.

Based on the interpolation method, a scanning interval can be set to:

$$\delta\beta = \frac{N}{N'n}\delta\theta$$

Herein, N' is the number of vertical densifications, n is the number of horizontal densification operations, N is the number of emitters, and n is a number divisible by N. At this time, in the central region, in addition to the inserted scanning lines, each group of scanning lines are also used for repeated scanning n more times. When the horizontal and vertical densification is performed at the same time, positions of the scanning lines used for repeated scanning can be obtained, and the laser is set and controlled for emission based on the positions of the repeated scanning lines.

Obtaining positions of the scanning lines used for repeated scanning and controlling the laser to perform emission based on the positions of the repeated scanning lines includes: obtaining the positions of the scanning lines used for repeated scanning; based on the positions of the scanning lines used for repeated scanning, obtaining a laser corresponding to the scanning lines in the emitter group that performs emission currently; and controlling the laser to perform emission based on preset emission time. The preset emission time is equal to the current emission time of the emitter group plus preset jitter period.

When scanning is repeated n times, and n>1, the jitter period is set based on the number of times of repeated scanning, so that the number of jitter periods is same as the number of times of repeated scanning. That is, if scanning is repeated n times, n jitter periods are included. The n jitter periods have unequal length. The n jitter periods may be random jitter periods, or may be set based on a requirement.

Figure 10:
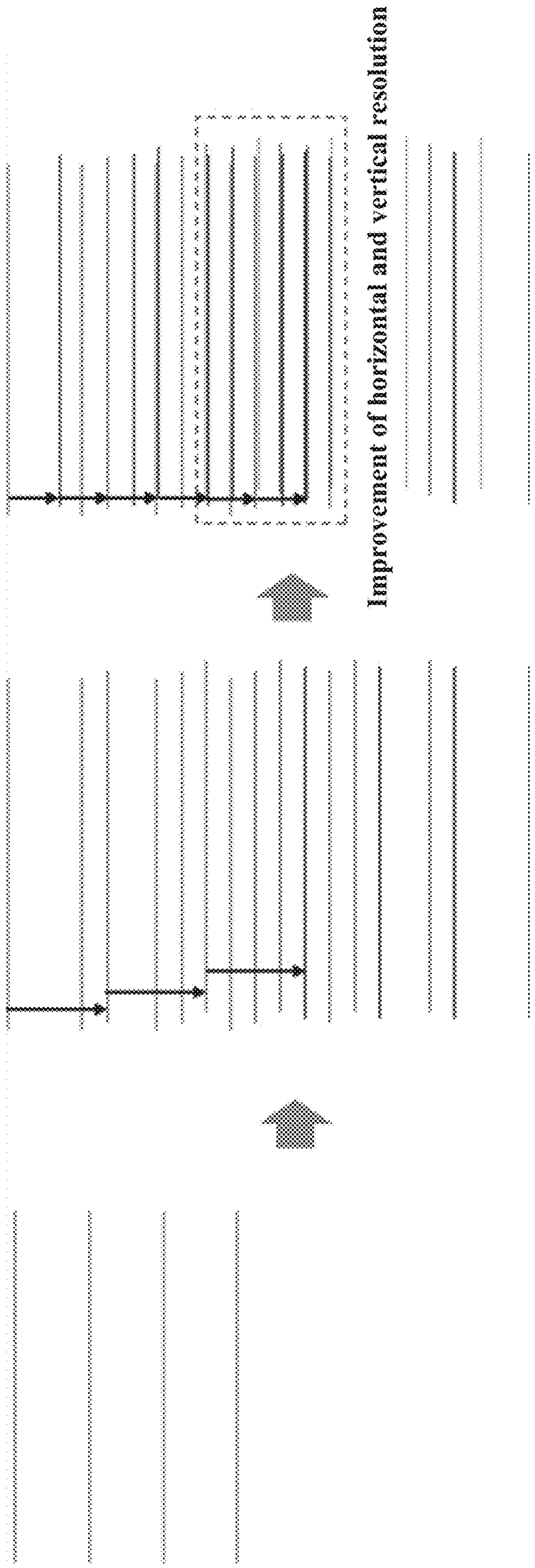
FIG. 10 is another schematic diagram of an example of improving point cloud density in the vertical direction according to an embodiment.

FIG. 10 shows an example, where N=4, N'=3, and n=2. The point cloud density in the vertical direction of the central region is $$\frac{\delta\theta}{N'},$$

the point cloud density in the horizontal direction is $$\frac{\delta\theta}{n},$$

and therefore, controlling N' and n can control the vertical and horizontal resolution.

S204. When the LiDAR is in a mode in which one emission corresponds to multiple receptions, and the point cloud densification multiple includes a horizontal point cloud densification multiple and a vertical point cloud densification multiple, obtain an interval between scanning lines of each emitter group; calculate a third product of multiplying the number of scanning lines of each emitter group by the interval between the scanning lines of each emitter group; calculate a fourth product of multiplying the vertical point cloud densification multiple by the horizontal point cloud densification multiple, where the horizontal point cloud densification multiple is divisible by a product of multiplying the number of scanning lines of each emitter group by the number of receivers corresponding to each emitter, and the vertical point cloud densification multiple is a prime number indivisible by the product of multiplying the number of scanning lines of each emitter group by the number of receivers corresponding to each emitter; and calculate a quotient of dividing the third product by the fourth product, to obtain the interval between the scanning lines corresponding to the two adjacent emissions.

The single-emission multiple- (denoted as $n_{mul}$) reception mode is also compatible in some embodiments. The most typical characteristic of the single-emission multiple-reception mode is that each group include $n_{mul}$ scanning lines closely attached, because one emitted light spot corresponds to several receptions. This case is obtained via generalization of interpolation. As shown above, in the case of interpolation, if N groups perform emission, and the interval is δθ, a scanning step is set to:

$$\delta\beta = \frac{N}{N'}\delta\theta$$

In this case, in the single-emission $n_{mul}$-reception mode, $n_{mul}$ receptions are kept being arranged vertically, and an angle interval of nearest neighbor receiving channels is:

$$\delta\theta' = \frac{\delta\theta}{N' n_{mul}}$$

As shown in FIG. 10, the scanning method of interpolation is still used, the point cloud density (that is, the minimum resolution) in the vertical direction of the central detection field of view can be increased to δθ'.

Further, as described above, the point cloud density in the horizontal direction of the central detection field of view can be densified again.

At this time, n should be set to be divisible by $Nn_{mul}$. At this time, the step is:

$$\delta\beta = \frac{N\delta\theta}{N' n}$$

Figure 11:
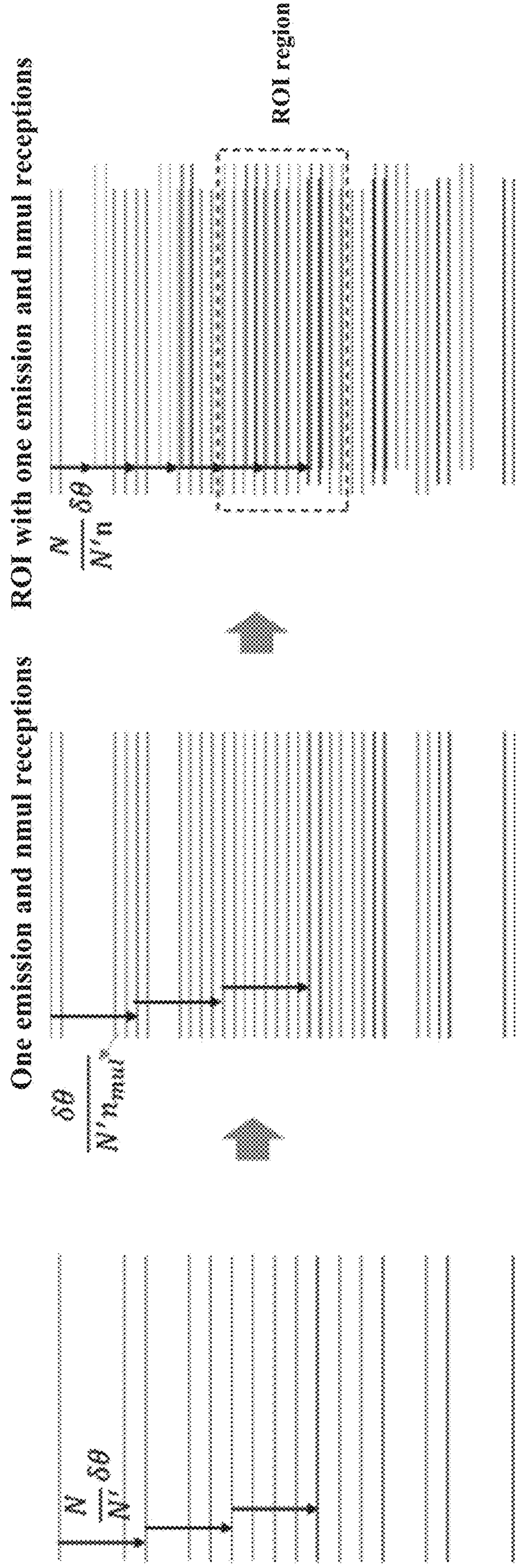
FIG. 11 is a schematic diagram of an example of improving point cloud density in a single-emission multiple-reception mode according to an embodiment.

Scanning lines with the point cloud density of $$\frac{N\delta\theta}{N' n_{mul}}$$

in the vertical direction and the point cloud density increased by n times in the horizontal direction can be formed in the center of the whole image (as shown in a left part of FIG. 11). In an example, assuming N=4, N' is a number indivisible by N, and therefore, 3 is selected. Exemplarily, $n_{mul}$ is set to 2, which is the simplest, and at this time, $Nn_{mul}$=8. Herein, n=2 (divisible by 8). An ROI region whose vertical resolution is $\delta\theta/(N'*n_{mul})=\delta\theta/6$ and whose horizontal resolution is increased by n (n=2) times is finally formed in the central region of the schematic diagram.

Figure 12:
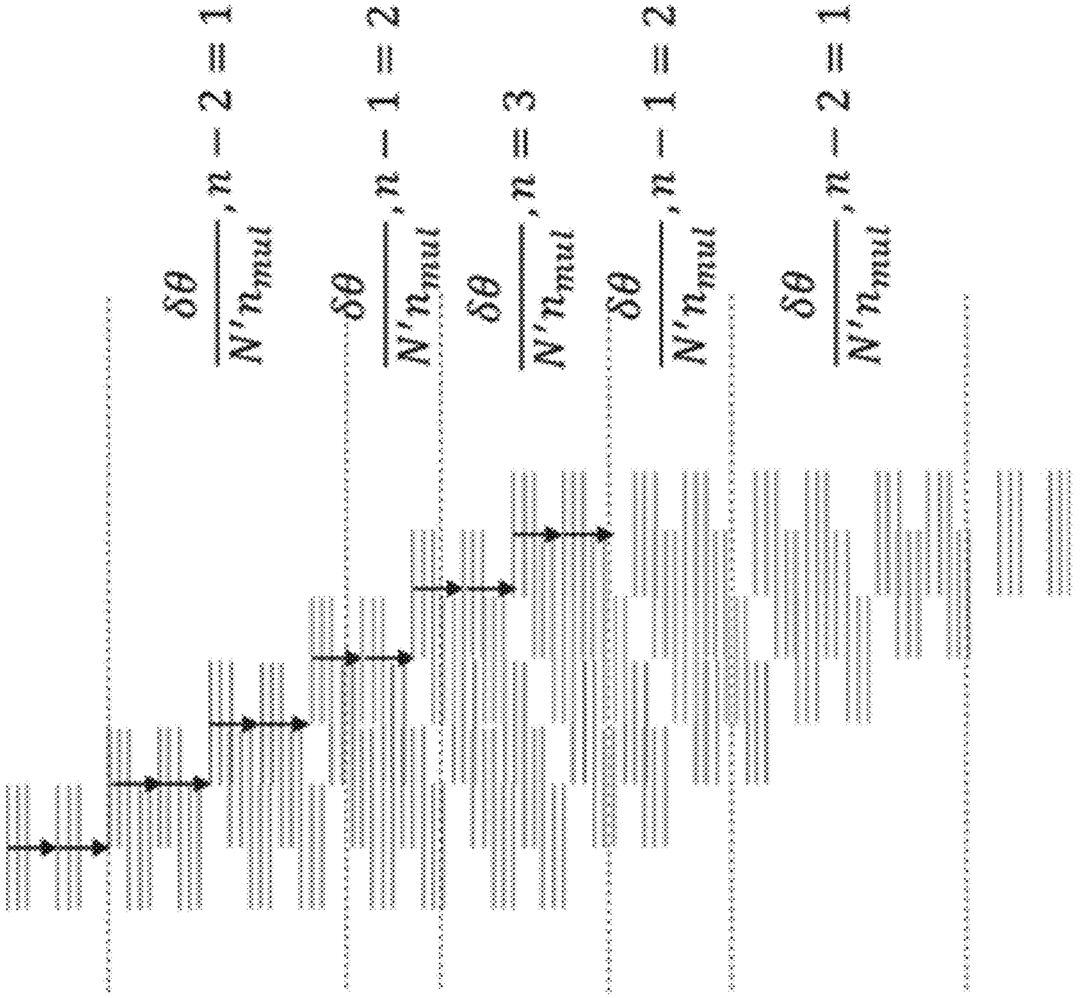
FIG. 12 is another schematic diagram of an example of improving point cloud density in a single-emission multiple-reception mode according to an embodiment.

For further illustration, FIG. 12 shows a group of scanning lines that follow the same principle but are slightly more complicated. At this time, details are as follows:

N=5

N'=4 (indivisible by N)

$n_{mul}$=3 (depending on a transceiver mode)

n=3 (number divisible by $Nn_{mul}$=15)

The scanning line group with the point cloud density of δθ/(4*3)=δθ/12 in the vertical direction and the point cloud density increased by 3 times in the horizontal direction is formed in the central region. In addition, the point cloud density of the scanning line in the horizontal direction has evolved from 3 times that in another position to 2 times that in another position, and then gradually evolved to be consistent with that in another position, that is, progressively densified. When the horizontal and vertical densification is performed at the same time, positions of horizontal densification (the scanning lines used for repeated scanning) can be obtained, and the laser is set and controlled for emission based on the positions of the repeated scanning lines.

Obtaining positions of the scanning lines used for repeated scanning and controlling the laser to perform emission based on the positions of the repeated scanning lines includes: obtaining the positions of the scanning lines used for repeated scanning; based on the positions of the scanning lines used for repeated scanning, obtaining a laser corresponding to the scanning lines in the emitter group that performs emission currently; and controlling the laser to perform emission based on preset emission time. The preset emission time is equal to the current emission time of the emitter group plus preset jitter period. The preset jitter period can be randomly encoded or set based on a requirement.

When a single scanning line repeatedly performs scanning n times, and n>1, the jitter period is set based on the number of times of repeated scanning, so that the number of jitter periods is same as the number of times of repeated scanning. That is, if scanning is repeated n times, n jitter periods are included. The n jitter periods have unequal length. The n jitter periods may be random jitter periods.

The jitter period is set for repeated scanning, so that repeated scanning is performed each time at intervals of a preset position in the horizontal position when the scanning apparatus uses the same step size in the same dimension, thereby achieving horizontal densification.

In some embodiments, when there are n overlapped scanning lines during the same emission, where n>1, and the numbers of repetitions of lines are the same, the same jittering period can also be set for the same emission of the laser corresponding to the n repeated scanning lines.

S205. Perform scanning based on the interval between the scanning lines corresponding to the two adjacent emissions.

For details, refer to S103.

In the embodiments of this application, the point cloud densification multiple of the detection field of view at each level is obtained, the interval between scanning lines corresponding to two adjacent emissions is obtained based on the point cloud densification multiple, and scanning is performed based on the interval between the scanning lines corresponding to the two adjacent emissions, which can densify the ROI by controlling the interval between the scanning lines corresponding to the two adjacent emissions and improve the detection efficiency of the LiDAR while ensuring the safety of human eyes. In addition, the single-emission multiple-reception mode may also be compatible, thereby achieving a broad application range and facilitating large-scale commercialization.

In some embodiments, when the single-emission $n_{mul}$-reception mode is used and horizontal arrangement is kept for $n_{mul}$-reception, as shown above, in the case of interpolation, if N groups perform emission, and the interval is δθ, a scanning step is set to:

$$\delta\beta = \frac{N}{N'}\delta\theta$$

Scanning lines with the point cloud density of $$\frac{N\delta\theta}{N'}$$

in the vertical direction and the point cloud density increased by $nn_{mul}$ times in the horizontal direction can be formed in the vertical direction in the center of the entire image, which can better resolve a problem of low repeated frequency of the LiDAR during emission, thereby further improving the ranging capability of the LiDAR.

Device embodiments of this application are provided below, and can be used to perform the method embodiments of this application. For details not disclosed in device embodiments of this application, refer to the method embodiments of this application.

Figure 13:
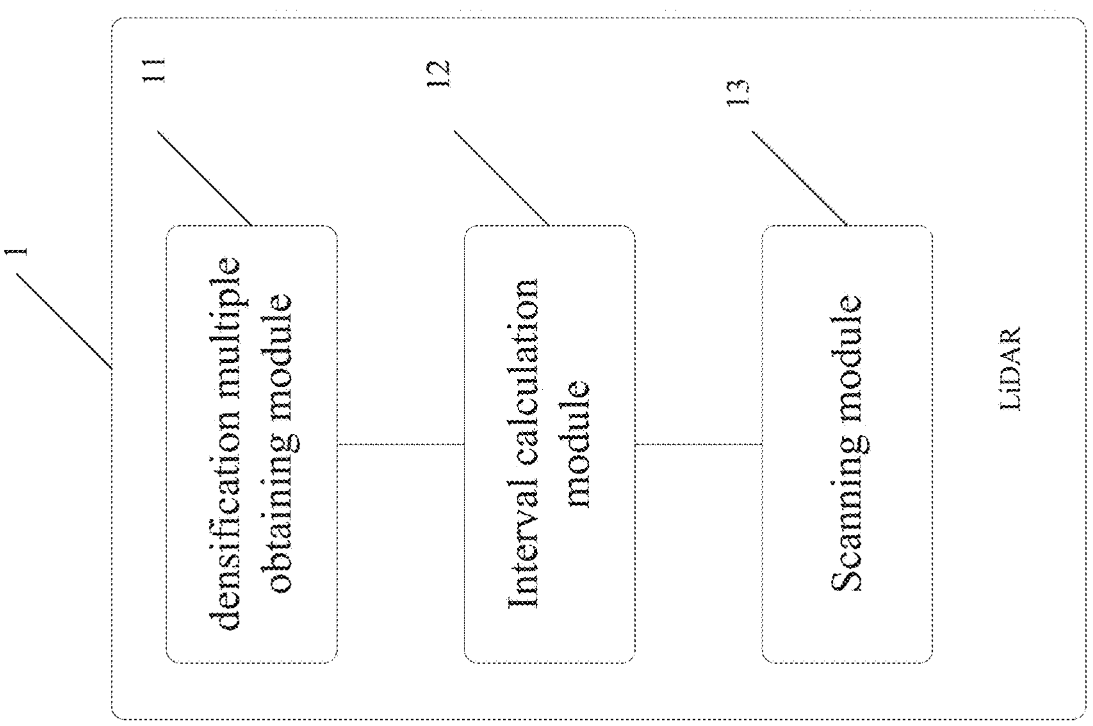
FIG. 13 is a schematic structural diagram of a point cloud densification apparatus according to an embodiment.

FIG. 13 is a schematic structural diagram of a point cloud densification apparatus according to an exemplary embodiment of this application. The point cloud densification apparatus can be implemented as all or a part of the LiDAR through software, hardware, or a combination thereof. The LiDAR includes an emitter group and a scanning apparatus, and the apparatus 1 includes a densification multiple obtaining module 11, an interval calculation module 12, and a scanning module 13.

The densification multiple obtaining module 11 is configured to obtain a point cloud densification multiple of a detection field of view at each level.

The interval calculation module 12 is configured to obtain an interval between scanning lines corresponding to two adjacent emissions based on the point cloud densification multiple of the detection field of view at each level.

The scanning module 13 is configured to perform scanning based on the interval between the scanning lines corresponding to the two adjacent emissions.

In some embodiments, the LiDAR is in a mode in which one emission corresponds to one reception, the point cloud densification multiple includes a horizontal point cloud densification multiple or a vertical point cloud densification multiple, and the interval calculation module 12 is configured to: obtain an interval between scanning lines of each emitter group; and calculate a product of multiplying the number of scanning lines of each emitter group by the interval between the scanning lines of each emitter group, and calculate a quotient of dividing the product by the horizontal point cloud densification multiple or the vertical point cloud densification multiple, to obtain the interval between the scanning lines corresponding to the two adjacent emissions.

In some embodiments, the LiDAR is in a mode in which one emission corresponds to one reception, the point cloud densification multiple includes a horizontal point cloud densification multiple and a vertical point cloud densification multiple, and the interval calculation module 12 is configured to: obtain an interval between scanning lines of each emitter group; calculate a first product of multiplying the number of scanning lines of each emitter group by the interval between the scanning lines of each emitter group; calculate a second product of multiplying the horizontal point cloud densification multiple by the vertical point cloud densification multiple; and calculate a quotient of dividing the first product by the second product, to obtain the interval between the scanning lines corresponding to the two adjacent emissions.

In some embodiments, the LiDAR is in a mode in which one emission corresponds to multiple receptions, the point cloud densification multiple includes a horizontal point cloud densification multiple and a vertical point cloud densification multiple, and the interval calculation module 12 is configured to: obtain an interval between scanning lines of each emitter group; calculate a third product of multiplying the number of scanning lines of each emitter group by the interval between the scanning lines of each emitter group; calculate a fourth product of multiplying the vertical resolution densification multiple by the horizontal resolution densification multiple, where the horizontal point cloud densification multiple is divisible by a product of multiplying the number of scanning lines of each emitter group by the number of receivers corresponding to each emitter, and the vertical point cloud densification multiple is a prime number indivisible by the product of multiplying the number of scanning lines of each emitter group by the number of receivers corresponding to each emitter; and calculate a quotient of dividing the third product by the fourth product, to obtain the interval between the scanning lines corresponding to the two adjacent emissions.

In some embodiments, the LiDAR has a first scanning direction and a second scanning direction, the interval between the scanning lines is implemented by a scanning apparatus by performing scanning in the first scanning direction, and the scanning module 13 is configured to: if a change angle of light in one scanning cycle in the second direction is greater than a detection angle of view set in the second direction, calculate a difference between the change angle of light in one scanning cycle in the second direction and the detection angle of view set in the second direction; calculate a quotient of dividing the difference by a scanning speed in the second direction, to obtain time corresponding to the two adjacent emissions corresponding to the interval between the scanning lines; and emit, by the emitter group, a detection laser beam to the scanning apparatus based on the time, and emit, by the scanning apparatus, the detection laser beam to the detection field of view for scanning.

In some embodiments, when the scanning apparatus moves at a uniform speed in the second direction, a scanning speed in the second direction is a uniform moving speed of the scanning apparatus; or when the scanning apparatus moves at a non-uniform speed in the second direction, a scanning speed in the second direction is an average moving speed of the scanning apparatus in the second direction.

When the point cloud densification apparatus provided in the foregoing embodiment performs the point cloud densification method, division of the foregoing functional modules is used as an example for illustration. In actual application, the foregoing functions can be allocated to different functional modules for implementation based on a requirement, that is, an inner structure of the device is divided into different functional modules to implement all or some of the functions described above. In addition, embodiments of the point cloud densification apparatus and the point cloud densification method provided above pertain to a same concept. For a specific implementation process, refer to the method embodiments.

In some embodiments, the point cloud densification multiple of the detection field of view at each level is obtained, the interval between scanning lines corresponding to two adjacent emissions is obtained based on the point cloud densification multiple, and scanning is performed based on the interval between the scanning lines corresponding to the two adjacent emissions, which can densify the ROI by controlling the interval between the scanning lines corresponding to the two adjacent emissions and improve the detection efficiency of the LiDAR while ensuring the safety of human eyes. In addition, the single-emission multiple-reception mode may also be compatible, thereby achieving a broad application range and facilitating large-scale commercialization.

Embodiments of this application also provide a computer storage medium. The computer storage medium may store multiple instructions. The instructions are capable of being loaded by a processor to perform the steps of the method in the embodiments shown in FIG. 2 to FIG. 11.

In an embodiment, a LiDAR stores at least one instruction. The at least one instruction is capable of being loaded by a processor to perform the steps of the foregoing method in the embodiments shown in FIG. 2 to FIG. 11. For a specific execution process, refer to the specific description of the embodiments shown in FIG. 2 to FIG. 13.

Figure 14:
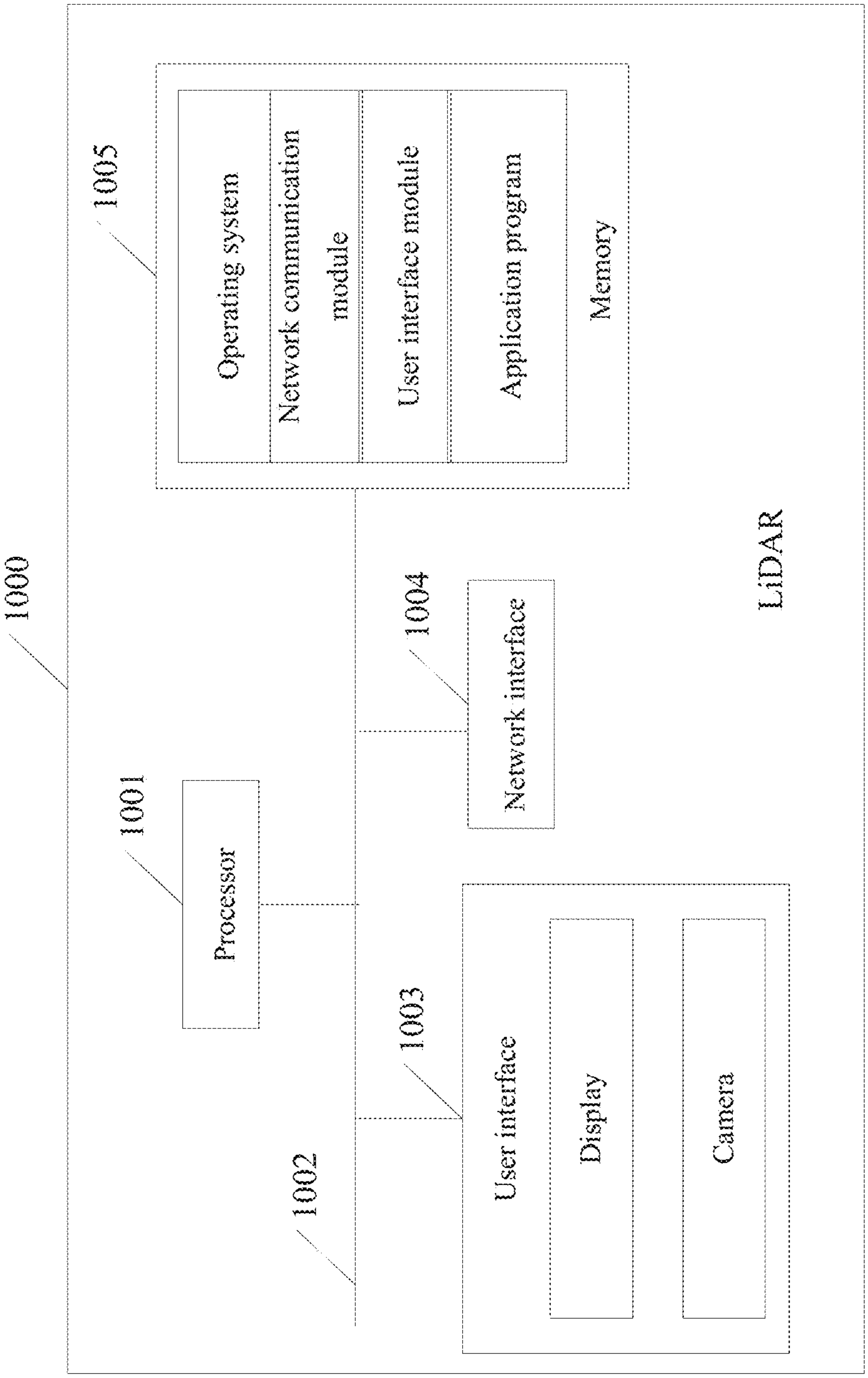
FIG. 14 is a schematic structural diagram of a LiDAR according to an embodiment.

FIG. 14 is a schematic structural diagram of a LiDAR according to an embodiment of this application. As shown in FIG. 12, the LiDAR 1000 may include: at least one processor 1001, at least one network interface 1004, a user interface 1003, a memory 1005, and at least one communication bus 1002.

Herein, the communication bus 1002 is configured to implement a connection and communication between these components.

Herein, the user interface 1003 may include a display and a camera, or the user interface 1003 may further include a standard wired interface and a wireless interface.

Herein, the network interface 1004 may include a standard wired interface and a wireless interface (such as, a Wi-Fi interface).

Herein, the processor 1001 may include one or more processing cores. The processor 1001 uses various interfaces and lines to connect various parts of the entire LiDAR 1000, and executes various functions and processes data of the LiDAR 1000 by running or executing instructions, programs, code sets, or instruction sets stored in the memory 1005, and invoking data stored in the memory 1005. In some embodiments, the processor 1001 may be realized in at least one hardware form of digital signal processing (DSP), a field-programmable gate array (FPGA), and a programmable logic array (PLA). The processor 1001 may integrate a combination of one or more of a central processing unit (CPU), a graphics processing unit (GPU), a modem, and the like. The GPU is configured to render and draw content that needs to be displayed on a display. The modem is configured to process wireless communication. It may be understood that the forgoing modem may not be integrated into the processor 1001, and may be implemented by one chip independently.

The memory 1005 may include a random access memory (RAM), or a read-only memory (ROM). In some embodiments, the memory 1005 includes a non-transitory computer-readable medium. The memory 1005 may be configured to store the instructions, the programs, the codes, the code sets, or the instruction sets. The memory 1005 may include a program storage region and a data storage region. The program storage region may store instructions for implementing the operating system, instructions for at least one function (such as a touch control function, a sound play function, and an image play function), and instructions for implementing each of the foregoing method embodiments. In some embodiments, the memory 1005 may also be at least one storage device distant from the forgoing processor 1001. As shown in FIG. 12, as a computer storage medium, the memory 1005 may include an operating system, a network communication module, a user interface module, and a point cloud density densification application program.

In the LiDAR 1000 shown in FIG. 14, the user interface 1003 is mainly configured to provide an input interface for a user to obtain data input by the user; and the processor 1001 can be configured to invoke the point cloud density densification application program stored in the memory 1005, and be configured to: obtain a point cloud densification multiple of a detection field of view at each level; obtain an interval between scanning lines corresponding to two adjacent emissions based on the point cloud densification multiple of the detection field of view at each level; and perform scanning based on the interval between the scanning lines corresponding to the two adjacent emissions.

In an embodiment, the LiDAR is in a mode in which one emission corresponds to one reception, the point cloud densification multiple includes a horizontal point cloud densification multiple or a vertical point cloud densification multiple, and when obtaining an interval between scanning lines corresponding to two adjacent emissions based on the point cloud densification multiple, the processor 1001 performs the following operations: obtaining an interval between scanning lines of each emitter group; and calculating a product of multiplying the number of scanning lines of each emitter group by the interval between the scanning lines of each emitter group, and calculating a quotient of dividing the product by the horizontal point cloud densification multiple or the vertical point cloud densification multiple, to obtain the interval between the scanning lines corresponding to the two adjacent emissions.

In an embodiment, the LiDAR is in a mode in which one emission corresponds to one reception, the point cloud densification multiple includes a horizontal point cloud densification multiple and a vertical point cloud densification multiple, and when obtaining an interval between scanning lines corresponding to two adjacent emissions based on the point cloud densification multiple, the processor 1001 performs the following operations: obtaining an interval between scanning lines of each emitter group; calculating a first product of multiplying the number of scanning lines of each emitter group by the interval between the scanning lines of each emitter group; calculating a second product of multiplying the horizontal point cloud densification multiple by the vertical point cloud densification multiple; and calculating a quotient of dividing the first product by the second product, to obtain the interval between the scanning lines corresponding to the two adjacent emissions.

In an embodiment, the LiDAR is in a mode in which one emission corresponds to multiple receptions, the point cloud densification multiple includes a horizontal point cloud densification multiple and a vertical point cloud densification multiple, and when obtaining an interval between scanning lines corresponding to two adjacent emissions based on the point cloud densification multiple, the processor 1001 performs the following operations: obtaining an interval between scanning lines of each emitter group; calculating a third product of multiplying the number of scanning lines of each emitter group by the interval between the scanning lines of each emitter group; calculating a fourth product of multiplying the vertical resolution densification multiple by the horizontal resolution densification multiple, where the horizontal point cloud densification multiple is divisible by a product of multiplying the number of scanning lines of each emitter group by the number of receivers corresponding to each emitter, and the vertical point cloud densification multiple is a prime number indivisible by the product of multiplying the number of scanning lines of each emitter group by the number of receivers corresponding to each emitter; and calculating a quotient of dividing the third product by the fourth product, to obtain the interval between the scanning lines corresponding to the two adjacent emissions.

In an embodiment, the LiDAR has a first scanning direction and a second scanning direction, the interval between the scanning lines is implemented by a scanning apparatus by performing scanning in the first scanning direction, and when performing scanning based on the interval between the scanning lines corresponding to the two adjacent emissions, the processor 1001 performs the following operations: if a change angle of light in one scanning cycle in the second direction is greater than a detection angle of view set in the second direction, calculating a difference between the change angle of light in one scanning cycle in the second direction and the detection angle of view set in the second direction; calculating a quotient of dividing the difference by a scanning speed in the second direction, to obtain time corresponding to the two adjacent emissions corresponding to the interval between the scanning lines; and emitting, by the emitter group, a detection laser beam to the scanning apparatus based on the time, and emitting, by the scanning apparatus, the detection laser beam to the detection field of view for scanning.

In an embodiment, when the scanning apparatus moves at a uniform speed in the second direction, a scanning speed in the second direction is a uniform moving speed of the scanning apparatus; or when the scanning apparatus moves at a non-uniform speed in the second direction, a scanning speed in the second direction is an average moving speed of the scanning apparatus in the second direction.

In the embodiments of this application, the point cloud densification multiple of the detection field of view at each level is obtained, the interval between scanning lines corresponding to two adjacent emissions is obtained based on the point cloud densification multiple, and scanning is performed based on the interval between the scanning lines corresponding to the two adjacent emissions, which can densify the ROI by controlling the interval between the scanning lines corresponding to the two adjacent emissions and improve the detection efficiency of the LiDAR while ensuring the safety of human eyes. In addition, the single-emission multiple-reception mode may also be compatible, thereby achieving a broad application range and facilitating large-scale commercialization.

All or part of procedures in methods of the forgoing embodiments can be implemented by instructing relevant hardware via computer program. The program can be stored in a computer readable storage medium. During execution, the computer program can include the procedures of the embodiments of the forgoing methods. A storage medium can be a magnetic disk, an optical disc, the read-only storage memory or the random storage memory, and so on.

What is claimed is:

1. A method of point cloud densification, applied to a LiDAR, wherein the LiDAR comprises one or more emitter groups and a scanning apparatus, and the method comprises:

obtaining a point cloud densification multiple of a detection field of view at each level;

obtaining an interval between scanning lines corresponding to two adjacent emissions based on the point cloud densification multiple of the detection field of view at each level; and performing scanning based on the interval between the scanning lines corresponding to the two adjacent emissions, the point cloud densification multiple comprises a horizontal point cloud densification multiple and a vertical point cloud densification multiple, and obtaining the interval between the scanning lines corresponding to the two adjacent emissions based on the point cloud densification multiple comprises:

obtaining an interval between scanning lines of each emitter group;

calculating a first product of multiplying a number of scanning lines of each emitter group by the interval between the scanning lines of each emitter group;

calculating a second product of multiplying the horizontal point cloud densification multiple by the vertical point cloud densification multiple; and calculating a quotient of dividing the first product by the second product, to obtain the interval between the scanning lines corresponding to the two adjacent emissions.

2. The method according to claim 1, wherein the LiDAR is in a mode in which one emission corresponds to multiple receptions, the point cloud densification multiple comprises the horizontal point cloud densification multiple and the vertical point cloud densification multiple, and obtaining the interval between the scanning lines corresponding to the two adjacent emissions based on the point cloud densification multiple comprises: obtaining the interval between scanning lines of each emitter group;

calculating a third product of multiplying the number of scanning lines of each emitter group by the interval between the scanning lines of each emitter group;

calculating a fourth product of multiplying the vertical point cloud densification multiple by the horizontal point cloud densification multiple, wherein the horizontal point cloud densification multiple is divisible by a product of multiplying the number of scanning lines of each emitter group by the number of receivers corresponding to each emitter, and the vertical point cloud densification multiple is a prime number indivisible by the product of multiplying the number of scanning lines of each emitter group by the number of receivers corresponding to each emitter; and calculating a quotient of dividing the third product by the fourth product, to obtain the interval between the scanning lines corresponding to the two adjacent emissions.

3. The method according to claim 1, wherein the LiDAR has a first scanning direction and a second scanning direction, the interval between the scanning lines is implemented by a scanning apparatus by performing scanning in the first scanning direction, and performing the scanning based on the interval between the scanning lines corresponding to the two adjacent emissions comprises:

when a change angle of light in one scanning cycle in the second direction is greater than a detection angle of view set in the second direction, calculating a difference between the change angle of light in one scanning cycle in the second direction and the detection angle of view set in the second direction and calculating a quotient of dividing the difference by a scanning speed in the second direction, to obtain time corresponding to the two adjacent emissions corresponding to the interval between the scanning lines; and emitting, by each emitter group, a detection laser beam to the scanning apparatus based on the time, and emitting, by the scanning apparatus, the detection laser beam to the detection field of view for scanning.

4. The method according to claim 3, wherein when the scanning apparatus moves at a uniform speed in the second direction, a scanning speed in the second direction is a uniform moving speed of the scanning apparatus; or when the scanning apparatus moves at a non-uniform speed in the second direction, a scanning speed in the second direction is an average moving speed of the scanning apparatus in the second direction.

5. An apparatus of point cloud densification, applied to a LiDAR, wherein the LiDAR comprises one or more emitter groups and a scanning apparatus, and the point cloud densification apparatus comprises:

a densification multiple obtaining module, configured to obtain a point cloud densification multiple of a detection field of view at each level;

an interval calculation module, configured to obtain an interval between scanning lines corresponding to two adjacent emissions based on the point cloud densification multiple of the detection field of view at each level; and a scanning module, configured to perform scanning based on the interval between the scanning lines corresponding to the two adjacent emissions, wherein the LiDAR is in a mode in which one emission corresponds to one reception, the point cloud densification multiple comprises a horizontal point cloud densification multiple and a vertical point cloud densification multiple, and the densification multiple obtaining module is configured to:

obtain an interval between scanning lines of each emitter group;

calculate a first product of multiplying a number of scanning lines of each emitter group by the interval between the scanning lines of each emitter group;

calculate a second product of multiplying the horizontal point cloud densification multiple by the vertical point cloud densification multiple; and calculate a quotient of dividing the first product by the second product, to obtain the interval between the scanning lines corresponding to the two adjacent emissions.

6. A LiDAR, comprising a processor and a non-transitory memory, wherein the non-transitory memory stores a computer program, and the computer program is capable of being loaded by the processor to perform steps of:

obtaining a point cloud densification multiple of a detection field of view at each level;

obtaining an interval between scanning lines corresponding to two adjacent emissions based on the point cloud densification multiple of the detection field of view at each level; and performing scanning based on the interval between the scanning lines corresponding to the two adjacent emissions, wherein the LiDAR is in a mode in which one emission corresponds to one reception, the point cloud densification multiple comprises a horizontal point cloud densification multiple and a vertical point cloud densification multiple, and obtaining the interval between the scanning lines corresponding to the two adjacent emissions based on the point cloud densification multiple comprises:

obtaining an interval between scanning lines of each emitter group;

calculating a first product of multiplying a number of scanning lines of each emitter group by the interval between the scanning lines of each emitter group;

calculating a second product of multiplying the horizontal point cloud densification multiple by the vertical point cloud densification multiple; and calculating a quotient of dividing the first product by the second product, to obtain the interval between the scanning lines corresponding to the two adjacent emissions.

7. The LiDAR according to claim 6, wherein the LiDAR is in a mode in which one emission corresponds to multiple receptions, the point cloud densification multiple comprises the horizontal point cloud densification multiple and the vertical point cloud densification multiple, and obtaining the interval between the scanning lines corresponding to the two adjacent emissions based on the point cloud densification multiple comprises: obtaining the interval between scanning lines of each emitter group;

calculating a third product of multiplying the number of scanning lines of each emitter group by the interval between the scanning lines of each emitter group;

calculating a fourth product of multiplying the vertical point cloud densification multiple by the horizontal point cloud densification multiple, wherein the horizontal point cloud densification multiple is divisible by a product of multiplying the number of scanning lines of each emitter group by the number of receivers corresponding to each emitter, and the vertical point cloud densification multiple is a prime number indivisible by the product of multiplying the number of scanning lines of each emitter group by the number of receivers corresponding to each emitter; and calculating a quotient of dividing the third product by the fourth product, to obtain the interval between the scanning lines corresponding to the two adjacent emissions.

8. The LiDAR according to claim 6, wherein the LiDAR has a first scanning direction and a second scanning direction, the interval between the scanning lines is implemented by a scanning apparatus by performing scanning in the first scanning direction, and performing the scanning based on the interval between the scanning lines corresponding to the two adjacent emissions comprises:

when a change angle of light in one scanning cycle in the second direction is greater than a detection angle of view set in the second direction, calculating a difference between the change angle of light in one scanning cycle in the second direction and the detection angle of view set in the second direction and calculating a quotient of dividing the difference by a scanning speed in the second direction, to obtain time corresponding to the two adjacent emissions corresponding to the interval between the scanning lines; and emitting, by each emitter group, a detection laser beam to the scanning apparatus based on the time, and emitting, by the scanning apparatus, the detection laser beam to the detection field of view for scanning.

9. The LiDAR according to claim 8, wherein when the scanning apparatus moves at a uniform speed in the second direction, a scanning speed in the second direction is a uniform moving speed of the scanning apparatus; or when the scanning apparatus moves at a non-uniform speed in the second direction, a scanning speed in the second direction is an average moving speed of the scanning apparatus in the second direction.

* * * * *